US007339934B2

(12) United States Patent
Mussman et al.

(10) Patent No.: US 7,339,934 B2
(45) Date of Patent: Mar. 4, 2008

(54) ALTERNATE ROUTING OF VOICE COMMUNICATION IN A PACKET-BASED NETWORK

(75) Inventors: Harry Edward Mussman, Bedford, MA (US); John Joseph McCabe, Billerica, MA (US); David Frederick McGuigan, Sudbury, MA (US); Robert Kellar Israel, Westford, MA (US); Eric Richard Sporel, Marlborough, MA (US)

(73) Assignee: Level 3 Communications, LLC, Broomfield, CO (US)

( * ) Notice: Subject to any disclaimer, the term of this patent is extended or adjusted under 35 U.S.C. 154(b) by 804 days.

(21) Appl. No.: 09/827,352

(22) Filed: Apr. 6, 2001

(65) Prior Publication Data

US 2003/0012178 A1    Jan. 16, 2003

(51) Int. Cl.
H04L 12/28 (2006.01)
(52) U.S. Cl. .................. 370/395.21; 370/230; 370/237; 370/395.2; 370/468
(58) Field of Classification Search ........... 370/216, 370/225–229, 238, 239, 351–356, 389, 395.1, 370/395.2, 395.31, 251–256, 230, 230.1, 370/231, 235, 237, 395.21, 395.41, 468
See application file for complete search history.

(56) References Cited

U.S. PATENT DOCUMENTS

| 4,284,852 | A | * | 8/1981 | Szybicki et al. ............. 370/218 |
| 4,679,186 | A | * | 7/1987 | Lea ............................. 370/218 |
| 4,991,204 | A | * | 2/1991 | Yamamoto et al. ........ 370/217 |
| 5,058,105 | A | * | 10/1991 | Mansour et al. ............ 370/228 |
| 5,956,339 | A | * | 9/1999 | Harada et al. .............. 370/396 |
| 6,067,545 | A | * | 5/2000 | Wolff .......................... 707/10 |
| 6,366,576 | B1 | * | 4/2002 | Haga .......................... 370/352 |
| 6,581,104 | B1 | * | 6/2003 | Bereiter ...................... 709/232 |
| 6,798,786 | B1 | * | 9/2004 | Lo et al. ..................... 370/468 |

FOREIGN PATENT DOCUMENTS

| EP | 0 966 145 | 12/1999 |
| EP | 1 014 633 | 6/2000 |
| EP | 1 035 719 | 9/2000 |
| EP | 1 089 535 | 4/2001 |
| WO | WO 99 14931 | 3/1999 |
| WO | WO 00 75744 | 12/2000 |
| WO | WO 00/75744 | 12/2000 |
| WO | WO 01 05115 | 1/2001 |
| WO | WO 01/05115 | 1/2001 |

OTHER PUBLICATIONS

Loa K. et al., "Enhanced H.323 Gateway With IVR Agent and H.323 Gatekeepers", Motorola Technical Developments, Motorola Inc., Schaumburg, IL, vol. 39, Sep. 1999, pp. 120-123.
Pearlman M. et al., "Alternate Path Routing in Mobile ad hoc Networks", IEEE, New York, 2000.

* cited by examiner

Primary Examiner—Chi Pham
Assistant Examiner—Donald L Mills
(74) Attorney, Agent, or Firm—Hensley Kim & Holzer, LLC

(57) ABSTRACT

A method for performing alternate and therefore least cost routing in distributed H.323 Voice over IP (VoIP) networks is provided. With this method, the VoIP network consists of a hierarchy of gatekeeper (GK) functions to provide alternate routing, network element redundancy, and scalability. The alternate routing function is performed by a directory gatekeeper with route selection advancing from a first route to a second route by either of two conditions: (1) there are no resources available to terminate the call in the first zone; and (2) a lack of response to the directory GK request for such resources.

26 Claims, 6 Drawing Sheets

ALTERNATE ROUTING OF VOICE COMMUNICATION IN A PACKET-BASED NETWORK

TECHNICAL FIELD

This invention relates to call routing in packet-based networks, and more particularly to alternate routing (e.g., least cost routing) of calls in a packet-based voice transmission system, for example, Voice over Internet Protocol (VoIP).

BACKGROUND

For many years, the Public Switched Telephone Network (PSTN) has provided a reliable mechanism for transmitting voice communications. However, the reliability of conventional telephone networks comes at high cost. Each established communication link in a conventional telephone network, reserves a bandwidth of 64 kbps for the duration, regardless of the bandwidth actually needed for the communications. A conventional telephone communication link uses a bandwidth of 64 kbps for all transmissions.

In contrast, conventional data communication networks are packet-based with no guarantee of reliability. In such a network, bandwidth is available on a first-come, first-serve basis. In a conventional packet-based network, voice communications may be broken into multiple packets. Packets are transmitted and then reassembled at the destination. Because packets may be lost or may arrive out of sequence, the quality of voice communications may suffer.

In the last few years, efforts have been made to converge data, voice, and video communications in a single network. For example, the International Telecommunication Union Telecommunication Standardization Sector (ITU-T) released the H.323 specification for transmitting audio, video, and data across an Internet Protocol (IP) network.

SUMMARY

A directory gatekeeper is provided for performing alternate routing of calls through gateway resources in a distributed network (e.g., H.323 Voice over IP). The directory gatekeeper includes one or more communication devices providing access to resource management gatekeepers. Each resource management gatekeeper is associated with one or more gateway resources. A memory device accessible by the directory gatekeeper stores a list of routes where each route is associated with one of the resource management gatekeepers A processor receives a request through one of the communication devices, and performs alternate routing by selecting a route from the list of routes using the corresponding resource management gatekeeper to determine resource availability.

In some implementations, the communication devices provide access to networks such as a packet-based network (e.g., an Internet protocol (IP) network), and the public switched telephone network (PSTN).

In some implementations, the directory gatekeeper performs alternate routing of calls by identifying one or more candidate routes based on a received request. Then, for each of the candidate routes, selecting a candidate route, determining if the selected candidate route is available, and sending a response to the received request indicating the available route or if the request can not be satisfied.

A route may be selected from the list of candidate routes in several ways. For example, the least cost route may be selected as the candidate route or candidate routes may be selected at a predetermined ratio. The predetermined ratio can be selected such that the likelihood of choosing each of the candidate routes is substantially equal.

The details of one or more implementations are set forth in the accompanying drawings and the description below. Other features and advantages will be apparent from the description and drawings, and from the claims

DETAILED DESCRIPTION

Voice over Internet Protocol (VoIP) networks provide one mechanism to transmit voice communication over packet-based networks. The International Telecomunication Union Telecommunication Standardization Sector (ITU-T) has published the H.323 standard for implementing VoIP systems. VoIP networks may be integrated with the Public Switched Telephone Network (PSTN) to provide connectivity between VoIP terminals and traditional telephones connected to the PSTN.

Figure 1:
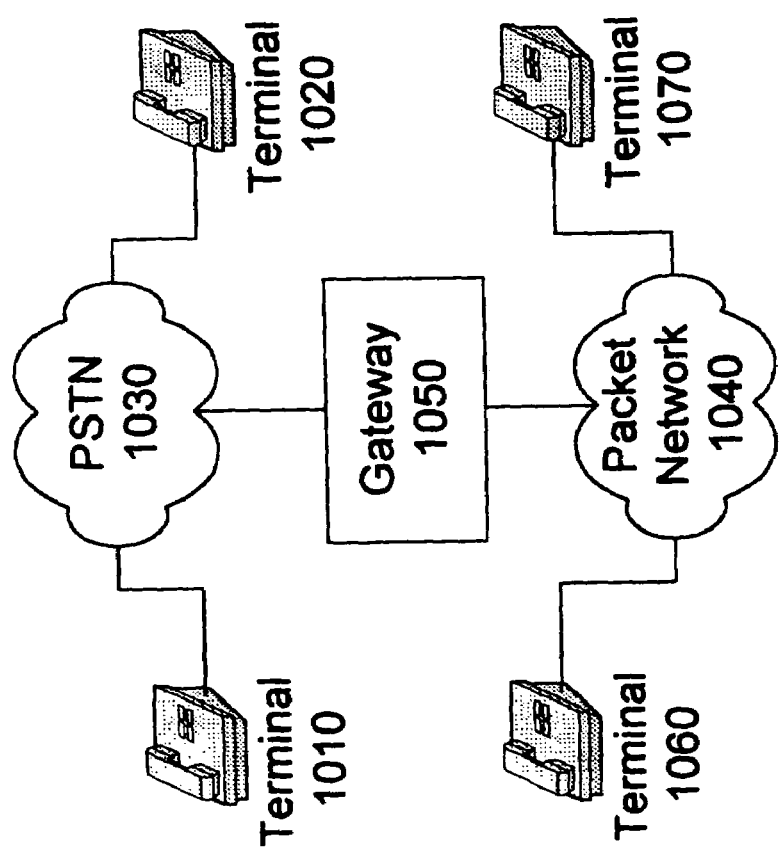
FIG. 1 is a block diagram of a hybrid communication network providing connectivity between a Public Switched Telephone Network (PSTN) and a packet-based network.

Referring to FIG. 1, terminals 1010 and 1020 connect to PSTN 1030 through a communication link, for example, one or more wires, a wireless link, and/or a fiber optic cable. Terminals 1010 and 1020 may transmit data across the communication link using analog or digital signals. Generally, a terminal is connected to the PSTN 1030 through analog, Integrated Services Digital Network (ISDN), or through a T1 carrier.

Packet network 1040 connects to PSTN 1030 through gateway 1050. Terminals 1060 and 1070 connect to packet network 1040 using any networking technology, for example, Ethernet, Asynchronous Transfer Mode (ATM), wireless network connection, and/or modem. Terminals 1060 and 1070 may be implemented using any device capable of sending and receiving audio, for example, as telephones, computers, personal digital assistant (PDA), laptop computer, and/or cellular phone.

The configuration shown in FIG. 1 permits voice communication between any of the terminals 1010, 1020, 1060, and 1070. Thus, voice communication may be transmitted from terminal 1010 to terminal 1060 across PSTN 1030 through gateway 1050 to packet network 1040.

Figure 2:
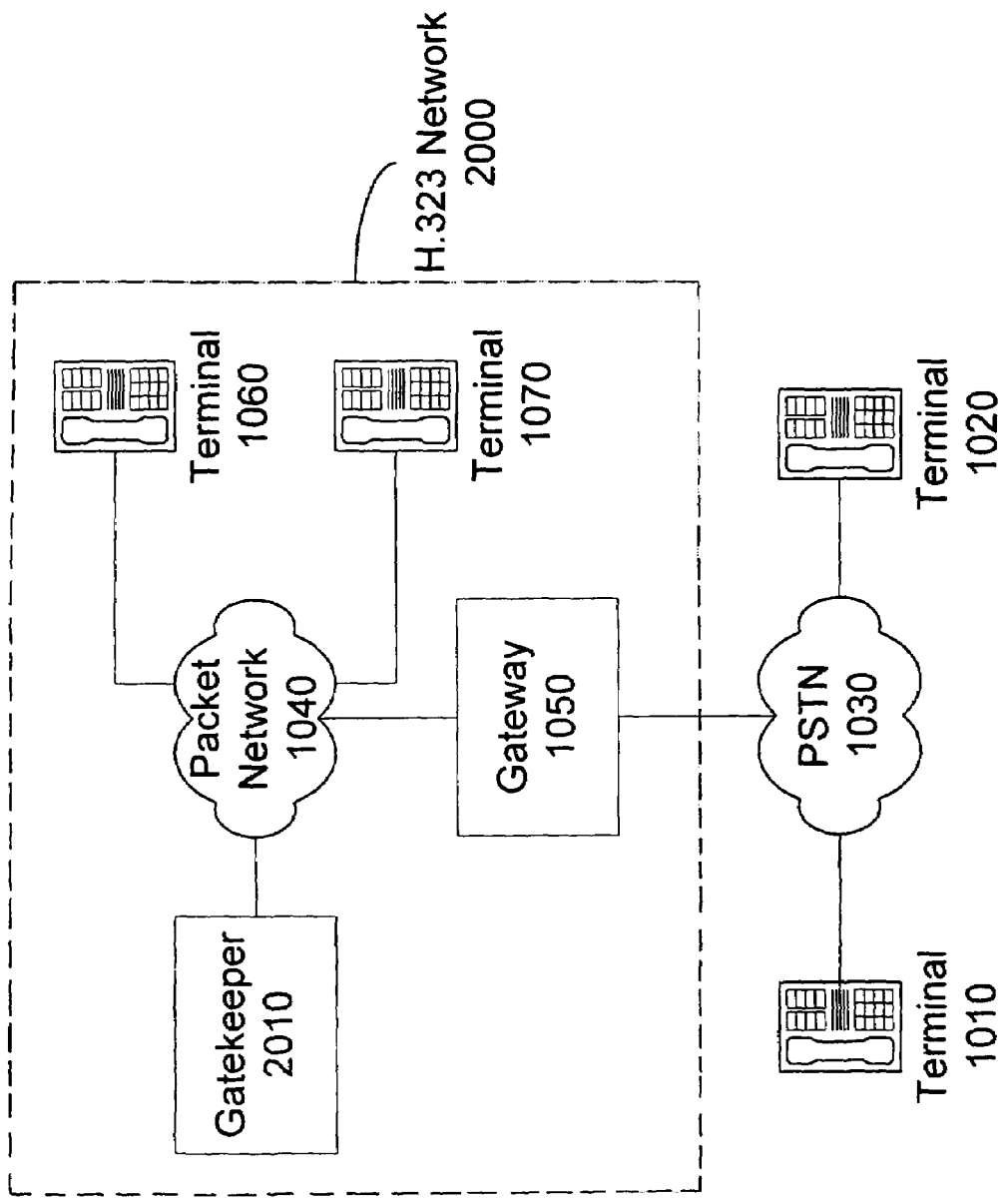
FIG. 2 is a block diagram of an H.323 implementation of a hybrid communication network such as that shown in FIG. 1.

Referring to FIG. 2, an H.323 implementation of the network described in FIG. 1 includes a H.323 network 2000 connected to PSTN 1030 through gateway 1050. The H.323 network 2000 includes terminals 1060 and 1070, Packet Network 1040, and gateway 1050 as described above with reference to FIG. 1. In addition. H.323 network 2000 includes gatekeeper 2010 to provide pre-call and call-level control services to H.323 terminals. The H.323 standard defines call signaling and control, multimedia transport and control, and bandwidth control for point-to-point and multipoint conferences.

Gatekeeper 2010 provides pre-call and call-level control services. For example, one implementation of gatekeeper 2010 provides the following services: (1) address translation to resolve endpoint IP addresses from aliases or standard phone numbers; (2) admissions control to restrict access to terminals or gateways; (3) bandwidth control to manage endpoint bandwidth requirements; (4) zone management capabilities for terminals, gateways, and other devices within a H.323 zone; and (5) call management capabilities, for example, maintaining a list of active calls so that the gatekeeper can determine if a terminal or endpoint is busy.

The demands of gatekeeper 2010 grow as the number of endpoints or terminals increases. At some point, it becomes impracticable to implement the pre-call and call-level control services on a single gatekeeper 2010. One way to overcome the limitations of a single gatekeeper 2010 is to distribute the functionality across multiple devices.

A distributed network architecture increases the ability to scale H.323 VoIP networks for large-scale deployments. In large networks, it may be advantageous to provide alternate routing between two terminals. For example, it may be desirable to route communications across the least expensive link, to balance load across multiple links, or to provide redundant communication paths. In one distributed gatekeeper implementation there is no central repository of current resource availability in an H.323 network (i.e., knowing which circuits in a group (or zone) are busy or idle, and therefore whether there is an idle circuit in the group).

Figure 3:
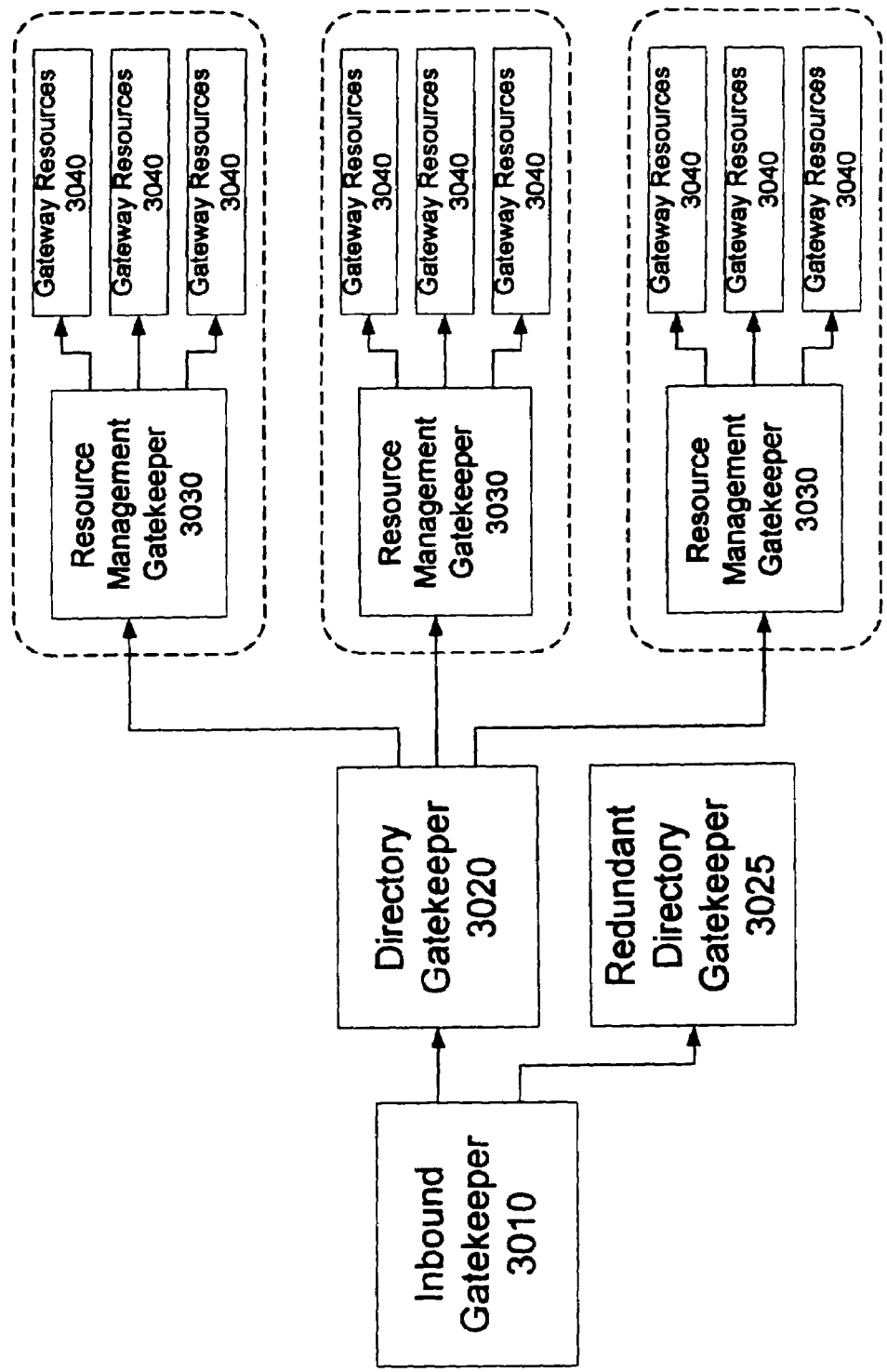
FIG. 3 is a block diagram of a gatekeeper hierarchy showing the relationship between an inbound gatekeeper, a directory gatekeeper, a resource management gatekeeper, and various gateway resources.

Referring to FIG. 3, a hierarchical distributed implementation splits the resource management functionality from the other gatekeeper functions discussed above. The implementation includes an inbound gatekeeper 3010, a directory gatekeeper 3020, a redundant directory level gatekeeper 3025, one or more resource management gatekeepers 3030, and one or more gateway resources 3040.

The directory gatekeeper 3020 manages the desired routing tables for calls. Some implementation the directory gatekeeper 3020 manages least cost routing information. In these implementations, call attempts are sent to directory gatekeeper 3020 for resolution of the appropriate least cost routing information. Based on the desired route selection order, directory gatekeeper 3020 sends a request to a resource management gatekeeper 3030 managing specific outbound gateway resources 3040. If there are gateway resources 3040 available to terminate the call attempt, the resource management gatekeeper 3030 acknowledges the directory gatekeeper 3020 request with the applicable gateway to forward the call to. If there are no gateway resources 3040 available, the resource management gatekeeper 3030 will reject the directory gatekeeper 3020 request. The directory gatekeeper 3020 will then advance the route selection index and send a request to the next resource management gatekeeper 3030 and the process repeats.

If the directory gatekeeper 3020 does not receive a response from the desired resource management gatekeeper 3030, the directory gatekeeper 3020 will also advance to the next resource management gatekeeper 3030, thus providing network redundancy for failure of any individual resource management gatekeeper 3030.

The inbound gatekeeper 3010 interfaces with the source of calls, and sends a routing request to the appropriate directory gatekeeper 3020. If there are gateway resources 3040 available to terminate the call attempt, the resource management gatekeeper 3030 acknowledges the directory gatekeeper 3020 request with the applicable gateway to forward the call to, and this in turn forwarded to the inbound gatekeeper 3010. If the inbound gatekeeper 3010 does not receive a response from the directory gatekeeper 3020, the inbound gatekeeper will advance to the alternate directory gatekeeper 3025, thus providing network redundancy for failure of a directory gatekeeper 3020.

As noted above, the resource management gatekeeper 3030 checks its knowledge of available gateway resources 3040 and acknowledges the directory gatekeeper 3020 request with the applicable gateway to forward the call to. To maintain a current view of gateway resources 3040, the various gateways periodically report their used and available resources to the resource management gatekeeper 3030. This can be done with detailed counts, or simply an indication that the resources in a zone are above or below a given threshold. When a resource management gatekeeper 3030 checks resources, it typically considers all of the gateway resources 3040 in a zone. However, it is sometimes advantageous to exclude certain gateways, and not consider them as candidates for carrying an outbound call. This is advantageous when, for example, the zone contains gateways associated with a given carrier, but where certain calls (say to the 212 area code) should be excluded from certain gateways (say those in New York) to avoid higher intra-state charges. This process may create "holes" in the routing.

Calls are initiated using the H.323 registration, admission, and status (RAS) protocol. In this protocol, a call is initiated by inbound gatekeeper 3010 by sending a location request (LRQ) message to the directory gatekeeper 3020. If the inbound gatekeeper 3010 does not receive a location confirmation message within a predefined time, the inbound gatekeeper 3010 sends another LRQ message to the redundant directory gatekeeper 3025.

Upon receiving a LRQ message from the inbound gatekeeper 3010, the directory gatekeeper 3020 selects the first route of several possible networks capable of terminating Voice over Internet Protocol (VoIP) calls. The directory gatekeeper 3020 issues a location request to the first resource management gatekeeper 3030. If the resource management gatekeeper has knowledge of a gateway resource 3040 that is capable of terminating the VoIP call attempt, the resource management gatekeeper 3030 responds to the directory gatekeeper 3020 with a location confirmation (LCF) message indicating the gateway resource 3040 where the call is to be terminated.

During the lifetime of a call, the resource management gatekeeper 3030 and the gateway resources 3040 provide resource availability information to each other. This resource availability information is required by the resource management gatekeeper 3030 to maintain the appropriate availability information required to properly respond to location requests received by the directory gatekeeper 3020.

If the resource management gatekeeper 3030 does not have knowledge of an available gateway resource 3040 to terminate the call attempt, the resource management gatekeeper 3030 responds to the location request from the directory gatekeeper 3020 with a location reject (LRJ) message indicating the lack of available resources.

If the directory gatekeeper 3020 receives a LRJ message or does not get a response from the resource management gatekeeper 3030 within a specified interval, the directory gatekeeper 3020 will advance to the next route and issue a new location request to a different resource management gatekeeper 3030. The process of sending location requests repeats until no additional routes are available. If no routes are available, the directory gatekeeper 3020 rejects the call request by sending an LRJ message to the inbound gatekeeper 3010.

Figure 4:
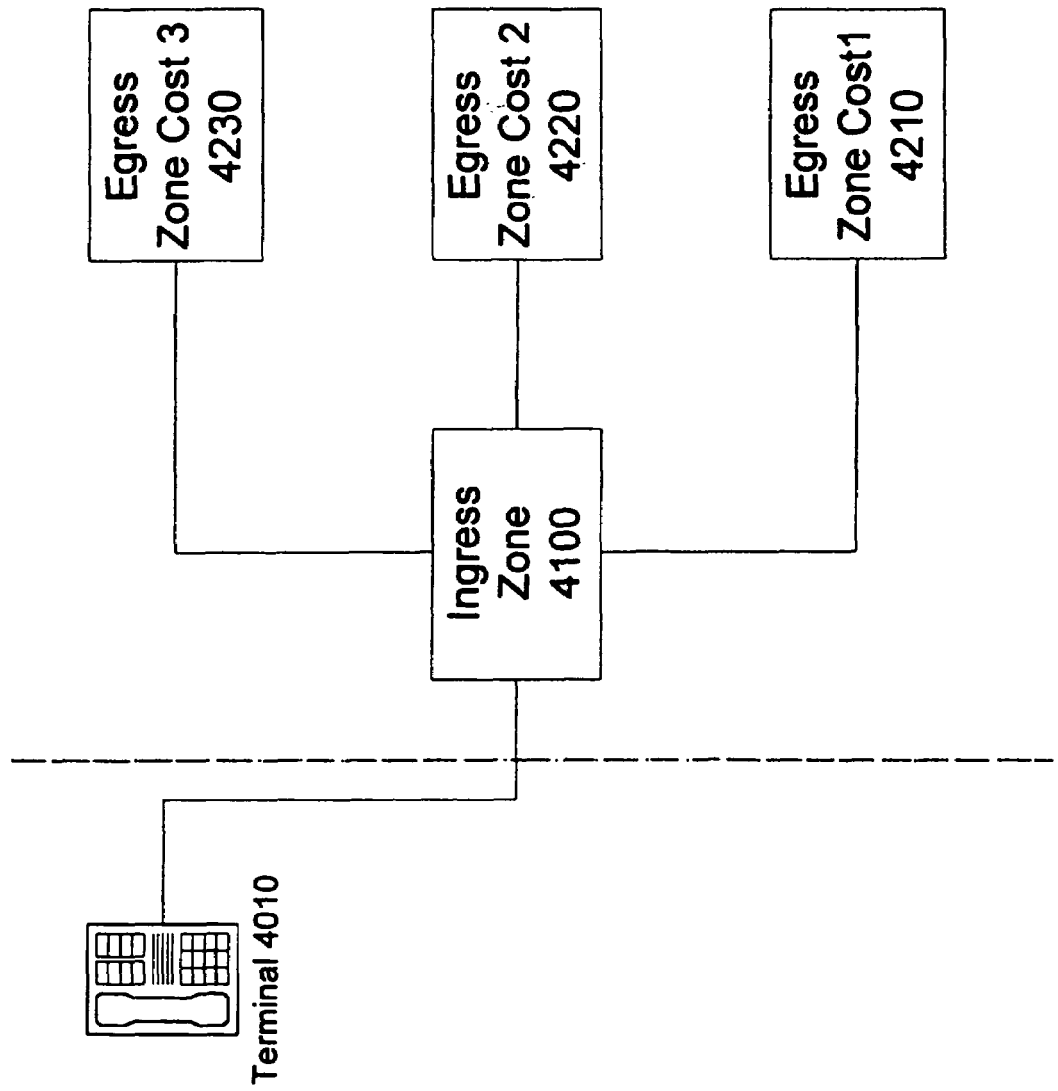
FIG. 4 is a block diagram describing an implementation of least cost routing using a hierarchical gatekeeper configuration such as that shown in FIG. 3.

Referring to FIG. 4, a terminal 4010 connects to ingress zone 4100. Ingress zone 4100 provides access to three egress zones 4210, 4220, and 4230 each having an associated cost or priority. In this example, egress zone 4210 provides access across a private network at the lowest cost; therefore, this zone is given the highest priority. Egress zone 4220 routes calls across another network at a higher cost than egress zone 4210. Finally, egress zone 4230 routes calls across the most expensive network and is therefore given the lowest priority.

Figure 5:
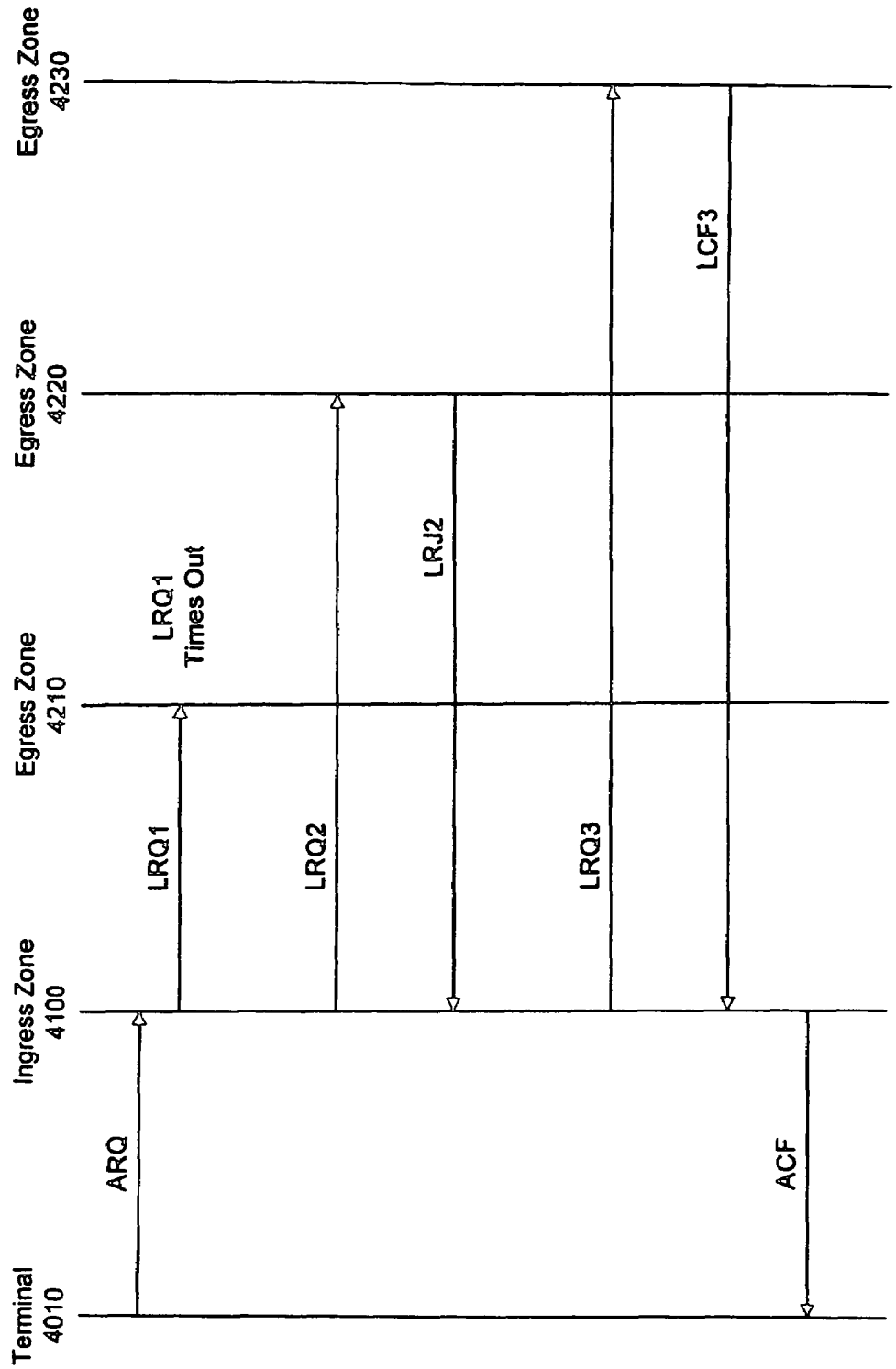
FIG. 5 is a diagram of an exemplary call sequence showing the interactions between the various zones shown in FIG. 4.

FIG. 5 describes an exemplary call sequence that may occur in the network described above with reference to FIG. 4. Terminal 4010 sends an admission request (ARQ) message to ingress zone 4100. A gatekeeper in ingress zone 4100 receives the request and sends a location request (LRQ) message to the least cost zone, egress zone 4210. This LRQ message (designated LRQ 1) times out after a predetermined amount of time.

The gatekeeper in ingress zone 4100 then sends an LRQ message to the next highest priority zone, egress zone 4220. Egress zone 4220 determines that resources are unavailable for terminal 4010 to complete a call through egress zone 4210 and so returns a location reject (LRJ) message (designated LRJ2 in FIG. 5). A gatekeeper in an egress zone may be implemented as a resource management gatekeeper 3030 as described above with reference to FIG. 3. Resource management gatekeepers 3030 may reject LRQ messages for the same reasons that location requests are rejected in conventional, single-gatekeeper implementations, for example, insufficient resources are available or the terminal has insufficient authorization.

After receiving LRJ2 from egress zone 4220, the gatekeeper in ingress zone 4100 sends a LRQ message (designated LRQ3) to the next zone on its list, egress zone 4230. The gatekeeper in egress zone 4230 responds to LRQ3 with a location confirmation (LCF) message. When ingress zone 4100 receives LCF3, an admission confirm (ACF) message is sent to terminal 4010. Calls then continue as in a single gatekeeper implementation. In this manner, least cost and alternate routing may be implemented in a structure providing increased reliability and scalability.

Figure 6:
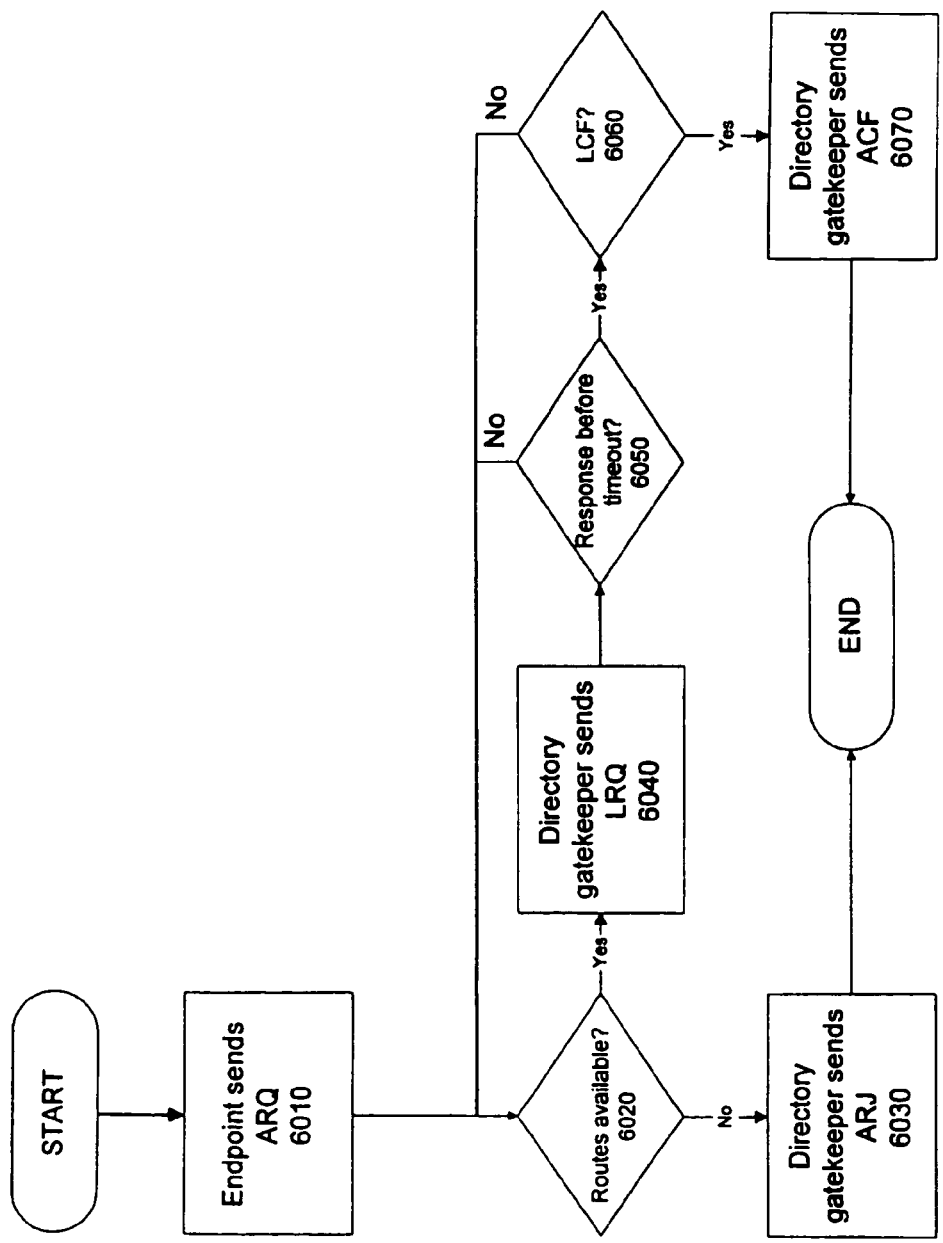
FIG. 6 is a block flowchart of the operation of call setup in a hierarchical gatekeeper configuration.

Referring to FIG. 6, an endpoint device (e.g., telephone, computer, cellular phone) attempting to complete a call to another endpoint device sends an admission request (ARQ) message to a directory gatekeeper (step 6010). The directory gatekeeper maintains a list of available routes. The list may be based on portions of identifications of called endpoint devices. For example, if the called endpoint device is 212 555-1212, the directory gatekeeper may maintain a list of numbering plan areas (NPAs) with corresponding routes. In one implementation, a directory gatekeeper maintains multiple routes to the NPA 212. In some implementation, these routes are maintained by manually configuring the directory gatekeeper; however, other implementations include the ability for a directory gatekeeper to dynamically create routing lists by receiving communications from various resource management gatekeepers.

The directory gatekeeper determines if routes are available (step 6020). If so, the directory gatekeeper sends a location request (LRQ) message to a resource management gatekeeper corresponding to that route (step 6020). Routes may be selected by any criteria. For example, in some implementations, the directory gatekeeper selects the least cost route. In some implementations, the directory gatekeeper balances the load across multiple routes based on some metric. For example, calls may routed across the first available, randomly-selected route, across the lowest cost available route, and calls may be distributed across two routes at a predetermined frequency (e.g., 40% of calls across one route and 60% across another, first 100 calls per day across one route and the remaining across another).

If no routes are available, the directory gatekeeper cannot terminate the call and sends an admission reject (ARJ) message back to the endpoint (step 6030), thus ending the process.

If routes are available, the directory gatekeeper sends a location request (LRQ) message to the gatekeeper corresponding to the selected route (step 6040). If no response is received before a predetermined timeout interval, then the gatekeeper determines if additional routes are available (step 6020).

If a response is received, the directory gatekeeper determines if the response is a location confirm (LCF) message (step 6060). If so, the directory gatekeeper sends an admission confirm (ACF) message for the available route (step 6070). If confirmation is not received (e.g., a location reject (LRJ) message is received), the directory gatekeeper checks to see if additional routes are available (step 6020). Using the process described in FIG. 6, a hierarchical gatekeeper system provides a mechanism for implementing alternate routing.

A number of implementations have been described. Nevertheless, it will be understood that various modifications may be made without departing from the spirit and scope of the invention Accordingly, other implementations are within the scope of the following claims

What is claimed is:

1. A directory gatekeeper for performing alternate routing of calls through a plurality of outbound gateway resources, the directory gatekeeper comprising:

one or more communication devices communicatively coupled to a plurality of resource management gatekeepers, each resource management gatekeeper associated with one or more of the plurality of outbound gateway resources, wherein each outbound gateway resource periodically reports the outbound gateway resource's availability to the outbound gateway resource's associated resource management gatekeeper;

another communication device communicatively coupled to an inbound gatekeeper, the inbound gatekeeper operable to send a routing request to the directory gatekeeper in response to receiving a call setup request and direct the call to an outbound gateway resource determined by the directory gatekeeper;

memory storing a list of routes, each route being associated with a resource management gatekeeper;

a processor operable to perform alternate routing by selecting one of the routes and sending a resource request to the resource management gatekeeper corresponding to the selected route to initiate the call through an outbound gateway resource associated with the selected resource management gatekeeper, wherein in response to receiving the resource request, the selected resource management gatekeeper checks outbound gateway resource availability to determine an available outbound gateway resource among the one or more gateway resources associated with the selected resource management gatekeeper, and notifies the directory gatekeeper of the determined available outbound gateway resource, and wherein the directory gatekeeper notifies the inbound gatekeeper of the available outbound gateway resource, to cause the inbound gatekeeper to direct the call through the available outbound gateway resource.

2. The directory gatekeeper of claim 1, wherein one of the one or more communication devices provides access to a packet-based network.

3. The directory gatekeeper of claim 2, wherein the packet-based network is an Internet protocol (IP) network.

4. The directory gatekeeper of claim 1, wherein the one or more communication devices provides access to the public switched telephone network (PSTN).

5. The directory gatekeeper of claim 1, wherein the processor selects a route by performing operations comprising:
 identifying one or more candidate routes based on the received routing request; and
 for each of the one or more candidate routes,
 selecting a candidate route from the one or more candidate routes.

6. The directory gatekeeper of claim 1, wherein the memory further comprises a list of Numbering Plan Areas (NPAs) corresponding to routes in the list of routes, wherein performing alternate routing of calls further includes:
 selecting a route from the list of routes based on an NPA of a called endpoint device associated with the call setup request.

7. The directory gatekeeper of claim 5, wherein selecting a candidate route from the one or more candidate routes includes selecting the least cost route as the candidate route.

8. The directory gatekeeper of claim 5, wherein selecting a candidate route from the one or more candidate routes includes selecting a candidate route from the one or more candidate routes at a predetermined ratio.

9. The directory gatekeeper of claim 8, wherein the predetermined ratio is selected such that the likelihood of choosing each of the one or more candidate routes is substantially equal.

10. A method for performing alternate routing of calls in a directory gatekeeper, the method comprising:
 receiving a request to initiate a call at an inbound gatekeeper; and
 in response to receiving the request to initiate the call:
 sending a routing request to a directory gatekeeper to request a route for terminating the call;
 determining, by the directory gatekeeper, a list of possible routes for terminating the call;
 selecting a route from the list of possible routes by querying a selected resource management gatekeeper to determine availability of outbound gateway resources associated with the selected route based on outbound gateway resource availability periodically reported to the selected resource management gatekeeper;
 if a route is available, sending a response to the received request to initiate a call indicating the selected route; and
 if a route is not available, sending a response to the received request to initiate a call indicating that the request will not be completed.

11. The method of claim 10, further comprising selecting a route from the list of possible routes by querying another resource management gatekeeper to dynamically determine availability of outbound gateway resources associated with the selected route.

12. The method of claim 11, wherein the list of possible routes includes routes corresponding to a numbering plan area (NPA) associated with the call.

13. The method of claim 10, wherein the request to initiate a call is an H.323 admission request (ARQ) message.

14. The method of claim 10, wherein each route in the list of routes is associated with a resource management gatekeeper.

15. The method of claim 14, wherein the step of selecting a route from the list of possible routes by querying one or more resource management gatekeepers includes:
 for each route in the list of possible routes,
 selecting a candidate route from the list of possible routes; and
 determining if the selected candidate route is available.

16. The method of claim 15, wherein selecting a candidate route from list of possible routes includes selecting the least cost route as the candidate route.

17. The method of claim 15, wherein selecting a candidate route from the list of possible routes includes selecting a candidate route from the list of possible routes at a predetermined ratio.

18. The method of claim 17, wherein the predetermined ratio is selected such that the likelihood of choosing each of the one or more candidate routes is substantially equal.

19. A computer-readable medium including software for performing alternate routing of calls through a plurality of outbound gateway resources, the software configuring a computer to perform a method, the method including:
 receiving a request to initiate a call;
 in response to receiving the request to initiate the call, determining a list of possible routes for terminating the call, wherein each route corresponds to a management gatekeeper managing a plurality of outbound gateway resources;
 selecting a route from the list of possible routes;
 querying a first management gatekeeper associated with the selected route to cause the first management gatekeeper to determine availability of outbound gateway resources associated with the selected route by checking outbound gateway resource availability periodically reported to the first management gatekeeper by the plurality of outbound gateway resources managed by the first management gatekeeper;
 if outbound gateway resources associated with the selected route are available, sending a response to the received request to initiate a call through the outbound gateway resources of the selected route; and
 if outbound gateway resources associated with the selected route are not available, sending a response to the received request to initiate a call indicating that the request will not be completed.

20. The computer-readable medium of claim 19, the method further comprising:
 determining that outbound gateway resources managed by the first management gatekeeper are not available;
 selecting another route from the list of possible routes; and
 querying a second management gatekeeper associated with the other selected route, to cause the second management gatekeeper to determine availability of outbound gateway resources associated with the other selected route by checking outbound gateway resource availability periodically reported to the second management gatekeeper by the plurality of outbound gateway resources managed by the second management gatekeeper.

21. The computer-readable medium of claim 20, wherein the routes in the list of possible routes correspond to a numbering plan area (NPA) associated with a called endpoint of the call.

22. The computer-readable medium of claim 19, wherein the request to initiate a call is an H.323 admission request (ARQ) message.

23. The computer-readable medium of claim 19, wherein the first management gatekeeper determines availability of outbound gateway resources by excluding certain outbound gateway resources.

24. A system for routing calls through a network, the system comprising:
- an inbound gatekeeper operable to receive requests to setup calls and issue routing requests for determining routes for requested calls;
- a plurality of resource zones, wherein each zone has an associated resource management gatekeeper and a plurality of outbound gateway resources configured to terminate calls received by the inbound gatekeeper, wherein each outbound gateway resource is further configured to periodically report the outbound gateway resource's availability to the resource management gatekeeper of the associated resource zone; and
- a directory gatekeeper having memory storing a plurality of routes through the resource zones, each route corresponding to one of the resource management gatekeepers, and wherein, in response to a routing request received from the inbound gatekeeper, the directory gatekeeper requests an outbound gateway resource from a resource management gatekeeper associated with a selected route, and
- wherein the selected resource management gatekeeper checks for an available outbound gateway resource among the plurality of outbound gateway resources in the resource zone of the selected resource management gatekeeper,
- wherein if an available outbound gateway resource is identified in the resource zone, the selected resource management gatekeeper notifies the directory gatekeeper of the available outbound gateway resource, and
- wherein if an available outbound gateway resource is not identified in the resource zone, the directory gatekeeper requests resources from another resource management gatekeeper in another zone by selecting another route corresponding to the other resource management gatekeeper.

25. The system of claim 24, wherein each resource management gatekeeper is operable to exclude certain outbound gateway resources during checking for available outbound gateway resources.

26. The system of claim 25, wherein each resource management gatekeeper is operable to exclude certain gateways when the associated zone is associated with a given carrier and the requested call is associated with a given area code.

* * * * *

UNITED STATES PATENT AND TRADEMARK OFFICE
CERTIFICATE OF CORRECTION

| | | |
|---|---|---|
| PATENT NO. | : 7,339,934 B2 | Page 1 of 1 |
| APPLICATION NO. | : 09/827352 | |
| DATED | : March 4, 2008 | |
| INVENTOR(S) | : Harry E. Mussman et al. | |

It is certified that error appears in the above-identified patent and that said Letters Patent is hereby corrected as shown below:

In Sheet 4 of 6, FIG. 4, reference numeral 4210 of the patent, delete "Cost1" and insert --Cost 1-- therefor.

In column 1, lines 49-50 of the patent, delete "gatekeepers" and insert --gatekeepers.-- therefor.

In column 2, line 8 of the patent, delete "claims" and insert --claims.-- therefor.

In column 2, line 35 of the patent, delete "telecomunication" and insert --telecommunication-- therefor.

In column 5, line 24 of the patent, delete "LRQ 1" and insert --LRQ1-- therefor.

In column 5, lines 55-56 of the patent, delete "212 555-1212," and insert --212-555-1212,-- therefor.

In column 6, line 6 of the patent, after "may" insert --be--.

In column 6, line 35 of the patent, delete "inventionAccordingly," and insert --invention. Accordingly,-- therefor.

In column 6, line 36 of the patent, delete "claims" and insert --claims.-- therefor.

In column 8, line 41 of the patent, delete "route" and insert --route,-- therefor.
(See amended claims, page 5, claim 19, line 10.)

Signed and Sealed this

Sixteenth Day of September, 2008

JON W. DUDAS
*Director of the United States Patent and Trademark Office*